US011361653B2

(12) United States Patent
Murphy et al.

(10) Patent No.: US 11,361,653 B2
(45) Date of Patent: Jun. 14, 2022

(54) SECURITY MONITORING APPARATUS USING VIRTUAL REALITY DISPLAY

(71) Applicant: Network Integrity Systems, Inc., Hickory, NC (US)

(72) Inventors: Cary R. Murphy, Hickory, NC (US); Dave E. Cunningham, Conover, NC (US); Mark K. Bridges, Hickory, NC (US); Joseph Giovannini, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 0 days.

(21) Appl. No.: 16/922,349

(22) Filed: Jul. 7, 2020

(65) Prior Publication Data

US 2021/0097845 A1 Apr. 1, 2021

Related U.S. Application Data

(60) Provisional application No. 62/871,960, filed on Jul. 9, 2019.

(51) Int. Cl.
*G08B 25/00* (2006.01)
*G08B 27/00* (2006.01)
*G06T 19/00* (2011.01)
*G08B 25/10* (2006.01)

(52) U.S. Cl.
CPC .......... *G08B 25/007* (2013.01); *G06T 19/006* (2013.01); *G08B 25/10* (2013.01); *G08B 27/001* (2013.01)

(58) Field of Classification Search
CPC combination set(s) only.
See application file for complete search history.

(56) References Cited

U.S. PATENT DOCUMENTS

| 10,930,079 | B1 * | 2/2021 | Cote | G09B 29/106 |
| 2018/0017381 | A1 * | 1/2018 | Holzl | G01B 11/272 |
| 2018/0077200 | A1 * | 3/2018 | Apvrille | H04L 63/1416 |
| 2018/0190029 | A1 * | 7/2018 | Stein | G02B 27/017 |
| 2018/0259486 | A1 * | 9/2018 | Babcock, IV | G02B 27/01 |
| 2020/0110935 | A1 * | 4/2020 | Paul | G06F 1/163 |
| 2020/0175842 | A1 * | 6/2020 | Merjanian | G06T 11/60 |

* cited by examiner

*Primary Examiner* — Thomas S McCormack
(74) *Attorney, Agent, or Firm* — Adrian D. Battison; Ade & Company Inc.; Ryan W. Dupuis

(57) ABSTRACT

An asset management apparatus includes an asset to be monitored such as a secure network and a monitoring system including at least one sensor responsive to events which are potentially damaging or threatening to the asset such as an intrusion. A control system is responsive to the sensor to provide an alarm output indicative of the event and includes data relating to the asset and the location of the at least one sensor therein. A portable display system for a first responder is provided to allow the first responder to carry the display system and the control system includes a communication component operating for displaying on the display system to the first responder while carried at the site at least some of the data or have access to the data relating to the asset at the site so that the first responder can associate the data relating to the site with the actual site.

22 Claims, 1 Drawing Sheet

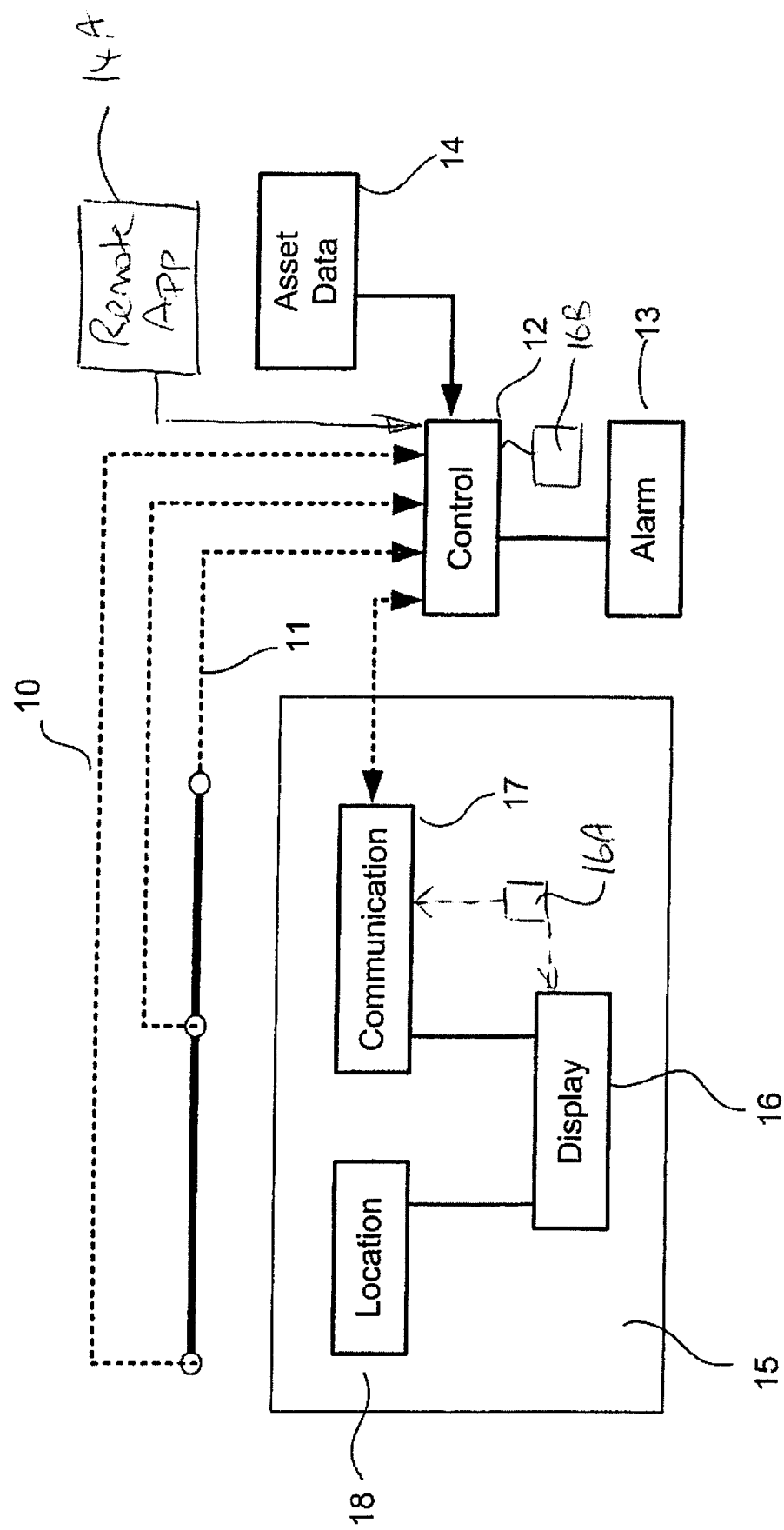

SECURITY MONITORING APPARATUS USING VIRTUAL REALITY DISPLAY

This application claims the benefit under 35 U.S.C. 119(e) of U.S. Provisional Application Ser. No. 62/871,970 filed Jul. 9, 2019.

Reference is made also to copending application Ser. No. 16/911,923 filed on Jun. 25, 2020 which claims priority from Provisional Application Ser. No. 62/867,332 filed Jun. 27, 2019, the disclosures of both of which are incorporated herein by reference.

This invention relates to a security monitoring system for an asset such as a communications network, perimeter area or other asset where at least one monitoring sensor communicates to a central monitor for issuing an alarm.

BACKGROUND OF THE INVENTION

Physical security technologies, including physical layer network security, perimeter security, fence monitoring, and any other type of asset or pathway monitoring, have allowed significant sensitivity and intrusion location capabilities. Utilizing technologies such as fiber optic sensors such as modalmetric, polarimetry, and distributed acoustic sensing (DAS), particularly when coupled with a management software application, offer significant sensitivity and intelligent alarm parsing for these applications. Practical requirements, as well as government standards, dictate a response to the alarm, which might include inspection or armed forces. Limitations to supporting these first responders include portable event information, as well as the lack of real time situational awareness.

The advent of Virtual Reality/Augmented Reality/Mixed Reality (VR/AR/MR) offers significant opportunity to solve these shortcomings.

As technology progresses, the lines between VR, AR, and MR are blurring, for this invention the following definitions will apply.

Virtual Reality (VR) is a fully immersive environment where the user is isolated from their location and is only aware and interacting with the content being presented. These devices are typically headsets that allow no visibility of the user's actual location. Popular in video games, this technology allows the user to see the proposed environment as they would see it if in person.

Augmented Reality—This technology allows the user to have full exposure to the environment while having access to additional information or content. Devices include headsets and smart devices such as phones, tablets, or wearable device such as a watch, where additional information is available. An example would be looking at a conduit through such a device, and the information as to what is contained is displayed—such as optical fiber, which network, or the condition of the monitoring alarm.

Mixed Reality—This technology allows the concurrent display of real and virtual objects as though they are real and in the same world. Devices include headsets and smart devices such as phones, tablets, and wearable device such as a watch. An example would be a user looking at a conduit, and a simulated cut-away being added to the view that shows the cables within that conduit.

SUMMARY OF THE INVENTION it is an object of the present invention to provide an improved monitoring system for an asset.

According to the invention there is provided an apparatus comprising:

an asset to be monitored;

a monitoring system including at least one sensor responsive to events which are potentially damaging to the asset;

a control system responsive to the at least one sensor to provide an alarm output indicative of the potential damaging event;

the control system containing data relating to the asset and the location of the at least one sensor therein;

a display system which is portable by a first responder to allow the first responder to carry the display system to the site of the event on the asset;

the display system being arranged for displaying on the display system to the first responder while carried at the site at least some of the data relating to the asset at the site so that the first responder can associate the data relating to the site with the actual site.

In one arrangement, the control system includes a communication component operating for communicating data to the display system for displaying to the first responder the data relating to the asset at the site.

In another arrangement the display system already has data stored on it so that no communication of data from the control system is required at the time of use. Also the system may use both previously stored data and other data available through a communication channel for the display.

According to the invention there is provided method for monitoring an asset comprising:

monitoring the asset using a at least one sensor responsive to events which are potentially damaging to the asset;

providing a control system responsive to the at least one sensor to provide an alarm output indicative of the potential damaging event;

saving in the control system data relating to the asset and the location to of the at least one sensor therein;

providing a display system to a first responder which is carried by the first responder to the site of the event on the asset;

and displaying on the display system to the first responder while carried at the site at least some of the data relating to the asset at the site so that the first responder can associate the data relating to the site with the actual site.

In one embodiment, the asset is a communications network and the sensor or sensors protect data by monitoring the conveyance with sensors to detect a nefarious intrusion that may be a threat to the security or availability of the data. In this embodiment the data displayed can relate to connections in the network or other network architecture.

In one embodiment, the asset is a physical network such as a pipeline, railroad, or pathway.

In one embodiment, the asset comprises a perimeter barrier.

In one embodiment, the data comprise an overlay graphic of the asset so that the first responder by comparing the data with the actual asset can visualize any changes.

In one embodiment, the data is displayed on a headset as an over lay visible against the actual asset or on a smart device or on a display screen including a vehicle wind shield.

In one embodiment, a graphic of the type of the event and the specific location of the event are overlaid on the display device to allow the first responder to visualize the event on the actual asset. Thus the data provides to the first responder the ability to "see" representations of parts of the asset such as buried sensors, locations of distributed sensors, and other pertinent devices. Thus the data provides to the first responder means by which the asset can intelligently be inspected and assessed.

In one embodiment, the display system has a location detection system and communicates to the control system its location so that the data displayed can be associated with the actual location. This can use GPS or triangulation systems from beacons or any other locations system carried on the display or obtained by information communicated between the control system and the display system. In one embodiment, the display system allows for definition of paths in the asset then display the path while user holds the display device pointed in a general direction of the asset.

In one embodiment, the display system comprises a Heads Up Display (HUD) in a vehicle such as on the wind shield or other display location in the vehicle. For example that allows the first responder to see a path of the asset while driving down a road or across a field. As another example where handholes and manholes of the asset are highlighted for user easy location and identification.

The arrangement herein can be used in network security such as in the commercial and federal spaces where there exist methods for protecting data by monitoring the conveyance (conduit, cable, etc) with sensors to detect a nefarious intrusion that may be a threat to the security or availability of the data. These intrusions may be reported to a central monitoring computer for analysis and corrective action. VR/MR/AR can be a tool used by the party responding (first responder) to these events.

In the use of MR, a responder wearing a MR headset or smart device may be led to the location of the event. MR may offer such information as an exploded view of the conveyance for awareness of the contents. Additionally, a graphic of the type of event, and location can be overlaid on the conveyance. Additionally, alerts as to on-going intrusions may warn of danger both in text or symbolic annunciation as well as displaying location or path to the site of the threat. This threat can be in the form of a perpetrator, or an environmental threat such as biological or nuclear hazards. An overlay can show correct configuration of the network, thereby pointing out any changes in patching, routing, etc.

The MR system can store graphics of connectors at a patch panel, and when viewing the actual array of connectors of the panel in comparison with the overlay from the display of the same panel on the display device, any changes are immediately visible. This is also useful for recovery from nefarious removal of patches or rapid equipment replacement.

The arrangement herein can be used in perimeter monitoring and facility security.

In the use of AR, a responder with an AR apparatus will be led to the event, and informed with specifications of the event, instructions on further actions to to take.

In the use of MR, for example, a responder on foot wearing a MR headset or smart device will have the ability to "see" representations of buried sensors, locations of distributed sensors, and other pertinent devices. An overlay graphic of the perimeter illustrates any changes such as removal of fence sections, barbed wire, cameras, or other security devices In another example, a responder in a vehicle will be able to follow the buried asset along a road by way of an overlaid graphic, as well as verify visible assets as compared to the same assets in their original installation condition.

In the use of AR, while wearing an AR headset or smart device, a responder can have real time data and situational awareness presented in a heads-up manner while approaching or inspecting the location of the event.

This arrangement herein can be used to monitor pipeline, railroad, or other pathways. Similar to the above, the pathway can intelligently be inspected and assessed through the use of VR/AR/MR.

In the use of VR for training responder, in class-room training can simulate an actual installation, allowing the trainee to work through any of the various scenarios as instruction or prior to being on-site.

Use of AR for training on equipment. Augmented content would guide the user through the set up and calibration steps.

VR/AR/MR systems may have internal GPS, with the installation in question having been previously geo-located to coordinates. Alternatively, it can be tied, electrically or through wireless link, to a portable device containing GPS, such as a smart phone, tablet, or wearable device such as a watch.

The application allows for definition of cable paths in an AR environment, then display the path (buried, aerial, or above ceiling indoors) while user holds a smart device with a camera pointed in general direction of the asset.

The system can provide a heads-up display (HUD) in a vehicle that allows a user to see cable path while driving down the road or across field, etc. Handholes and manholes are highlighted for easy location and identification by the user.

The system can include integration with security applications that highlight a detected intrusion event so that user is able to locate easily the event area and investigate the event.

The system can include integration with asset management applications to allow owners of the assets to easily locate the assets.

The system can include integration with a cloud-based app that allows construction and other trades to locate underground assets before digging. Extension of the app to property owners also allows them to locate assets on their property. The extension of this is a library of assets in a repeatable format for sharing data between vendors such as municipal water, gas, and electricity; for construction purposes as well as future "call before you dig" location of assets.

BRIEF DESCRIPTION OF THE DRAWINGS

One embodiment of the invention will now be described in conjunction with the accompanying drawings in which:

FIG. 1 is a schematic illustration of a apparatus according to the present invention.

DETAILED DESCRIPTION

The apparatus of the present invention comprises an asset 10 to be monitored with a monitoring system including a plurality of sensors 11 responsive to events which are potentially damaging to the asset. A control system 12 is responsive to signals on supply lines 11A from the sensors to provide an alarm output 13 indicative of the potential damaging event. The control system contains information from a source containing data 14 relating to the asset and the location of the sensors 11 therein. A portable display system 15 includes a display 16 such as a head set or other screen which is portable by the first responder to allow the first responder to carry the display system to the site of the event on the asset. The control system communicates though a system 17 to the display displaying on the display system to the first responder while carried at the site, the location of which is indicated by a location detection system 18 at least some of the data relating to the asset at the site so that the first responder can associate the data relating to the site with the actual site.

The data can be displayed on a headset as an over lay visible against the actual asset where the data comprise an overlay graphic of the asset so that the first responder by comparing the data with the actual asset can visualize any changes.

The data can be displayed on a display screen including a vehicle wind shield where the display system allows for definition of cable paths then display the path while user holds the display device pointed in a general direction of the asset. That is the display comprises a heads up display (HUD) in a vehicle that allows the first responder to see a path of the asset while driving down a road or across a field, where handholes and manholes of the cable or pipeline are highlighted for user easy location and identification.

Also as shown in FIG. 1 the display system 15 provides communication from a camera 16A recording the scene as watched through the headset which is transmitted to and is visible on a display 16B at the home base for consultation.

Practical requirements, as well as government standards, dictate the response to the alarm, which might include inspection or armed forces. Previous limitations to supporting first responders of this type has included lack of portable event information, as well as the lack of real time situational awareness.

The control system can be portable or self-contained so that it also is movable to a required location.

The system can include integration with a cloud-based app 14A that allows construction and other trades to locate underground assets before digging. The system can provide an extension of the app to property owners also allows them to locate assets on their property. The extension of this is a library of assets in a repeatable format for sharing data between vendors such as municipal water, gas, and electricity; for construction purposes as well as future "call before you dig" location of assets.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus comprising:
an asset to be monitored;
a monitoring system including at least one sensor responsive to an event which is potentially damaging or threatening to the asset;
a plurality of cable paths forming a part of the asset and/or of the monitoring system;
a control system responsive to the at least one sensor to provide an alarm output indicative of the potential damaging event;
the control system containing data relating to the asset and the location of the at least one sensor therein;
a display system which is portable by a first responder to allow the first responder to carry the display system to the site of the event on the asset;
the display system being arranged for displaying on the display system to the first responder while carried at the site at least some of the data relating to the asset at the site so that the first responder can associate the data relating to the site with the actual site;
wherein the display system allows for definition of images of said cable paths and then acts to display at least one of the images of the cable paths while the first responder holds the display system pointed in a general direction of said at least one of said cable paths.

2. The apparatus according to claim 1 wherein the control system includes a communication channel operating for communicating said data to the display system for displaying to the first responder the data relating to the asset at the site.

3. The apparatus according to claim 1 wherein the display system already has said data stored on it so that no communication of said data from the control system is required at the time of use.

4. The apparatus according to claim 1 wherein the display system uses as said data both previously stored data components and other data components available through a communication channel for the display.

5. The apparatus according to claim 1 wherein the asset is a communications network and the at least one sensor protects communication data by monitoring a conveyance of the network with said at least one sensor arranged to detect a nefarious intrusion that may be a threat to the security or availability of the communication data.

6. The apparatus according to claim 5 wherein the images displayed relates to connections in the communications network.

7. The apparatus according to claim 1 wherein the display system comprises a Heads Up Display (HUD) in a vehicle that allows the first responder to see a path of the asset while driving down a road or across a field, where handholes and manholes of the asset are highlighted for user easy location and identification.

8. The apparatus according to claim 1 wherein there is provided a camera at the display system by which the asset is visible at the control system for consultation.

9. The apparatus according to claim 1 wherein there is provided a cloud-based app that allows persons to locate assets on a property for example before digging or other construction purposes such as municipal water, gas, and electricity.

10. Apparatus comprising:
an asset to be monitored;
a monitoring system including at least one sensor responsive to events which are potentially damaging or threatening to the asset;
a control system responsive to the at least one sensor to provide an alarm output indicative of the potential damaging event;
the control system containing data relating to the asset and the location of the at least one sensor therein;
a display system which is portable by a first responder to allow the first responder to carry the display system to the site of the event on the asset;
the display system being arranged for displaying on the display system to the first responder while carried at the site at least some of the data relating to the asset at the site so that the first responder can associate the data relating to the site with the actual site;
wherein the asset comprises a plurality of components;
wherein the display system allows for definition of images of the components of the asset then display the images of the components while the first responder holds the display system pointed in a general direction of the components;

wherein the data comprise an overlay graphic of the components of the asset so that the first responder by comparing display data of the images of the components with the components of the asset can visualize any changes to the components.

11. The apparatus according to claim 10 wherein the data provides to the first responder the ability to said images of the components of the asset including buried sensors and locations of distributed sensors.

12. The apparatus according to claim 10 wherein the data provides to the first responder data by which the components of the asset can intelligently be inspected and assessed.

13. The apparatus according to claim 10 wherein the display system has a location detection system and communicates to the control system its location so that the images displayed are associated with the actual location.

14. The apparatus according to claim 10 wherein the display system comprises a Heads Up Display (HUD) in a vehicle that allows the first responder to see a path of the asset while driving down a road or across a field, where handholes and manholes of the asset are highlighted for easy location and identification by the first responder.

15. The apparatus according to claim 10 wherein there is provided a camera at the display system by which the components of the asset as watched on the display system are visible at the control system for consultation.

16. Apparatus comprising:
an asset to be monitored;
a monitoring system responsive to events which are potentially damaging or threatening to the asset;
a control system responsive to the at least one sensor to provide an alarm output indicative of the potential damaging event;
the control system containing data relating to the asset and the location of the at least one sensor therein;
a display system which is portable by a first responder to allow the first responder to carry the display system to the site of the event on the asset;
the display system being arranged for displaying on the display system to the first responder while carried at the site at least some of the data relating to the asset at the site so that the first responder can associate the data relating to the site with the actual site;

wherein the asset comprises a perimeter barrier and the monitoring system comprises a sensor arrangement on the perimeter barrier arranged for detecting intrusion attempts at a plurality of positions on the perimeter barrier and at least one cable connecting the sensor arrangement for communication to the control system.

17. The apparatus according to claim 16 wherein the display system allows for definition of said sensor arrangement and said at least one cable and then acts to display an image of said sensor arrangement and said at least one cable while the first responder holds the display system pointed in a general direction of said sensor arrangement and said at least one cable.

18. The apparatus according to claim 16 wherein the data provides to the first responder the ability to view images of said sensor arrangement and said at least one cable of the asset including buried sensors and locations of distributed sensors.

19. The apparatus according to claim 16 wherein the data provides to the first responder data by which said sensor arrangement and said at least one cable of the asset can intelligently be inspected and assessed.

20. The apparatus according to claim 16 wherein the display system has a location detection system and communicates to the control system its location so that the images displayed are associated with the actual location.

21. The apparatus according to claim 16 wherein the display system comprises a Heads Up Display (HUD) in a vehicle that allows the first responder to see said sensor arrangement and said at least one cable of the asset while driving down a road or across a field, where handholes and manholes of the asset are highlighted for easy location and identification by the first responder.

22. The apparatus according to claim 16 wherein there is provided a camera at the display system by which said sensor arrangement and said at least one cable of the asset as watched on the display system are visible at the control system for consultation.

* * * * *